US012515971B2

(12) United States Patent
Wang et al.

(10) Patent No.: US 12,515,971 B2
(45) Date of Patent: Jan. 6, 2026

(54) CONSTRUCTED WETLAND STRUCTURE AND METHODS FOR PREPARING AND USING CARBON SOURCE

(71) Applicant: Harbin Normal University, Harbin (CN)

(72) Inventors: Hanxi Wang, Harbin (CN); Lingyun Fan, Harbin (CN); Hongjun Zhang, Harbin (CN); Shuang Zhao, Harbin (CN); Xifeng Zhao, Harbin (CN); Wenjing Zhao, Harbin (CN); Lingyan Wang, Harbin (CN)

(73) Assignee: Harbin Normal University, Harbin (CN)

( * ) Notice: Subject to any disclaimer, the term of this patent is extended or adjusted under 35 U.S.C. 154(b) by 46 days.

(21) Appl. No.: 18/941,364

(22) Filed: Nov. 8, 2024

(65) Prior Publication Data

US 2025/0171339 A1 May 29, 2025

(30) Foreign Application Priority Data

Nov. 28, 2023 (CN) .......................... 202311594603.4

(51) Int. Cl.
C02F 3/32 (2023.01)
C02F 1/00 (2023.01)
(Continued)

(52) U.S. Cl.
CPC .............. *C02F 3/327* (2013.01); *C02F 1/001* (2013.01); *C02F 1/283* (2013.01); *C02F 2103/007* (2013.01)

(58) Field of Classification Search
CPC ...... C02F 2101/16; C02F 3/327; C02F 3/302; C02F 3/308; Y02W 10/10
(Continued)

(56) References Cited

U.S. PATENT DOCUMENTS

| 11,685,682 | B1 * | 6/2023 | Roback .............. B01D 21/0054 210/304 |
| 2015/0128672 | A1 * | 5/2015 | Shearer .................... C05G 3/00 71/24 |

(Continued)

FOREIGN PATENT DOCUMENTS

| CN | 102689989 A | 9/2012 |
| CN | 103214093 A * | 7/2013 |

(Continued)

OTHER PUBLICATIONS

USEPA. "Constructed Wetlands". EPA 843-F-03-013 Office of Water. Aug. 2004 (Year: 2004).*

(Continued)

*Primary Examiner* — Magali P Slawski
*Assistant Examiner* — Marriah Cg Ellington
(74) *Attorney, Agent, or Firm* — IPro, PLLC; Na Xu

(57) ABSTRACT

Disclosed are a constructed wetland structure and methods for preparing and using a carbon source, which relate to the technical field of biological treatment of water pollutants, and solve the problems of poor uniformity, complexity, unsatisfactory effects and high operating costs in existing carbon source adding methods. The present disclosure includes a water inlet pond, a treatment unit, and a water storage pond, which communicate in sequence. In the treatment unit, plant straws and biochar are used to prepare a carbon source. By modifying the carbon source material, the carbon source is released stably. By arranging carbon source layers, under the action of a water flow, the uniformity of carbon source distribution is guaranteed. The carbon source is periodically cleaned and replaced. Carbon source material is a biomass material which features a wide source and low costs.

6 Claims, 3 Drawing Sheets

(51) Int. Cl.
 C02F 1/28 (2023.01)
 C02F 103/00 (2006.01)

(58) Field of Classification Search
 USPC ..... 210/602, 605, 170.09, 170.03, 601, 614, 210/617, 630, 631, 170.7, 170.08, 170.1, 210/198.1, 220, 254, 747.7, 747.5
 See application file for complete search history.

(56) References Cited

U.S. PATENT DOCUMENTS

| | | | | |
|---|---|---|---|---|
| 2016/0207808 | A1* | 7/2016 | Castellanos Roldán | C02F 1/32 |
| 2020/0392027 | A1* | 12/2020 | Xi | C02F 9/00 |
| 2020/0399157 | A1* | 12/2020 | Wang | C02F 3/32 |
| 2021/0171379 | A1* | 6/2021 | Xi | C02F 9/00 |
| 2022/0274856 | A1* | 9/2022 | Recsetar | C02F 1/001 |
| 2023/0339793 | A1* | 10/2023 | Xue | C02F 3/006 |

FOREIGN PATENT DOCUMENTS

| | | | | |
|---|---|---|---|---|
| CN | 103274530 | A | | 9/2013 |
| CN | 104761057 | A * | | 7/2015 |
| CN | 206554149 | U * | | 10/2017 |
| CN | 206580631 | U | | 10/2017 |
| CN | 206692417 | U * | | 12/2017 |
| CN | 207330662 | U * | 5/2018 | C02F 9/00 |
| CN | 109592788 | A * | | 4/2019 |
| CN | 115784514 | A | | 3/2023 |

OTHER PUBLICATIONS

H.-C. Tee et al. / Bioresource Technology 104 (2012) 235â242. doi: 10.1016/j.biortech.2011.11.032 (Year: 2012).*
CN103214093-Desc-en (Year: 2013).*
CN_104761057_A_translated (Year: 2015).*
Indika Herath and Meththika Vithanage. "Phytoremediation: Management of Environmental Contaminants", vol. 2, 2015. DOI 10.1007/978-3-319-10969-5_21 (Year: 2015).*
CN206554149-Desc translated (Year: 2017).*
CN 109592788 A Translated (Year: 2019).*
Weiyue. Micron_Micro_Hole_Perforated_Pipe_Welded_Duct_Strainer. Aug. 2022. https://wymetalmesh.en.made-in-china.com/product/VZdGbmwhkakB/China-Micron-Micro-Hole-Perforated-Pipe-Welded-Duct-Strainer.html (Year: 2022).*
Aegis. Perforated Pipe. Nov. 3, 2023. https://aegismetal.en.made-in-china.com/product/xQMrzhkuuGYq/China-3mm-Hole-Punching-Porous-Stainless-Cylindrical-Tube-Filter-Meshed-Pipe-Made-in-China.html (Year: 2023).*
El Barkaoui et al. Ecological Engineering 190 (2023) 106927 (Year: 2023).*
CN207330662-Desc-en (Year: 2018).*
CN206692417-Desc-en (Year: 2017).*
Y. Liu et al. Science of the Total Environment 819 (2022) 152063. http://dx.doi.org/10.1016/j.scitotenv.2021.152063 (Year: 2022).*
"Study on modification of corn straw biochar substrate in constructed wetland and its application of city tail water treatment", Wang Hanxi, Full Text Database of Doctoral Dissertations in Engineering Science I Series, vol. 11, No. 11. Nov. 30, 2022.

* cited by examiner

CONSTRUCTED WETLAND STRUCTURE AND METHODS FOR PREPARING AND USING CARBON SOURCE

TECHNICAL FIELD

The present disclosure relates to the technical field of ecological treatment of water pollutants, and particularly relates to a constructed wetland structure and methods for preparing and using a carbon source.

BACKGROUND

Carbon sources are indispensable materials for microorganisms in constructed wetlands. In some constructed wetlands, insufficient carbon sources result in reduced nitrogen removal effects. However, at present, the costs of carbon source materials are high, which increases the operating costs of the constructed wetlands. In addition, unordered release of the carbon sources increases the difficulty to deeply purify the water quality of the constructed wetlands. Therefore, seeking a low-cost carbon source that can be used sustainably is significant to efficient operation of the constructed wetlands.

After the operation of the constructed wetland for a period of time, the carbon sources in the system are consumed. When the carbon sources are not supplemented externally, the carbon sources of the constructed wetland system are insufficient, and nitrogen removal by the constructed wetland is gradually reduced, so that the operating efficiency of the constructed wetland is reduced. At present, there are diverse methods for supplementing the carbon source, for example, glucose, polyhydroxyalkanoate, a liquid biological carbon source, a mixture of mannitol and sodium acetate, branches and leaves of plants, a plant root system secreted and self-metabolized carbon source, corn cobs, a plant material hydrolysate (the concentration of COD is 3000-4000 mg/L), a carbon source extracting solution prepared by reactions between plants and sulfuric acid, a polyester solid carbon source, an alkali-treated *Lythrum salicaria* carbon source, branches, reed straws, corn straws, sawdust, cattail straws, *canna* straws, wetland plant straws, alkali-treated corn straws, a biomass material and the like. However, they cannot be used sustainably. In particular, when the constructed wetland operates at a high load, the carbon sources are consumed largely and need to be supplemented at high frequency, which increases the operating instability of the constructed wetland system. Moreover, to add the carbon source presently, there are problems of poor uniformity, complexity, unsatisfactory effects, high operating costs and the like that need to be solved. These problems restrict efficient operation of the constructed wetland, and therefore, developing a biomass material that releases the carbon source stably is of great significance.

SUMMARY

To solve the problems of poor uniformity, complexity, unsatisfactory effects and high operating costs in above-mentioned existing carbon source adding methods, the present disclosure specially provides a constructed wetland structure and methods for preparing and using a carbon source. In the present disclosure, plant straws and biochar are used to prepare a mixed material carbon source. By modifying the carbon source material, the carbon source is released stably. By arranging a specified carbon source layer for the constructed wetland, under the action of a running water flow, the uniformity of carbon source distribution in a constructed wetland substrate is guaranteed. By periodically cleaning the residual carbon source poor in carbon source release and replacing the residual carbon source with a new carbon source, the carbon source is used sustainably. The raw material used in the present disclosure is the biomass material which features a wide source and low costs. The constructed wetland structure is simple, and it is convenient to prepare the carbon source and replace the constructed wetland system, so that stable and efficient operation of deeply purifying sewage of the constructed wetland is achieved.

The present disclosure provides a constructed wetland structure, specifically including a water inlet pond, a treatment unit, and a water storage pond, the water inlet pond, the treatment unit, and the water storage pond communicating in sequence, where the treatment unit is provided with a bottom plate, a drainage channel, a permeable plate, a bottom layer substrate, a middle layer substrate, a top layer substrate, and wetland plants from bottom to top in sequence; and the treatment unit includes a first unit, a plurality of middle units, and a tail unit, where partition walls are arranged among the water inlet pond, the first unit, the plurality of middle units, the tail unit, and the water storage pond, and the water inlet pond, the first unit, the plurality of middle units, the tail unit, and the water storage pond communicate in sequence through a plurality of water through ports formed in the partition walls, and a filter block is arranged in each of the water through ports; an upper carbon source layer, a lower carbon source layer, a carbon source injection pipe, and a connecting pipe are arranged in each of the first unit, the plurality of middle units, and the tail unit, and the carbon source injection pipe is longitudinally arranged and communicates with the upper carbon source layer and the lower carbon source layer through the connecting pipe, respectively; the upper carbon source layer in the first unit is arranged in the middle of the middle layer substrate, and the lower carbon source layer is arranged between the middle layer substrate and the bottom layer substrate; and carbon source materials are arranged in the upper carbon source layer and the lower carbon source layer.

From the first unit, the upper carbon source layer in an odd middle unit is arranged between the middle layer substrate and the top layer substrate, and the lower carbon source layer is arranged in the middle of the middle layer substrate; and the upper carbon source layer in an even middle unit is arranged in the middle of the middle layer substrate, and the lower carbon source layer is arranged between the middle layer substrate and the bottom layer substrate; and The water through port between the first unit and the water inlet pond is formed at a lower end of the partition wall, the water through port between the odd middle unit and the previous unit is formed at an upper end of the partition wall, and the water through port between the even middle unit and the previous unit is formed at the lower end of the partition wall.

Further, an even number of the plurality of middle units are provided, the upper carbon source layer in the tail unit is arranged between the middle layer substrate and the top layer substrate, and the lower carbon source layer is arranged in the middle of the middle layer substrate; the water through port between the tail unit and the previous middle unit is formed at the upper end of the partition wall;

and the water through port between the tail unit and the water storage pond is formed at the lower end of the partition wall.

Further, an odd number of the plurality of middle units are provided, the upper carbon source layer in the tail unit is arranged in the middle of the middle layer substrate, and the lower carbon source layer is arranged between the middle layer substrate and the bottom layer substrate; the water through port between the tail unit and the previous middle unit is formed at the lower end of the partition wall; and the water through port between the tail unit and the water storage pond is formed at the upper end of the partition wall.

Further, the filter block has pores with a pore diameter of 5-10 mm and porosity of 65-85%.

Further, the permeable plate has pores with a pore diameter of 3-8 mm and porosity of 60-80%.

Further, the partition walls include an internal parting wall of the water inlet pond, a plurality of unit partition walls, an internal parting wall of the water storage pond, and two wetland external walls, where the internal parting wall of the water inlet pond is arranged between the water inlet pond and the first unit; the unit partition walls are arranged among the first unit, the plurality of middle units, and the tail unit; the internal parting wall of the water storage pond is arranged between the tail unit and the water storage pond; the two wetland external walls are arranged on both sides of the constructed wetland structure in a width direction; and brackets are arranged at upper ends of the internal parting wall of the water inlet pond, the plurality of unit partition walls, the internal parting wall of the water storage pond, and the two wetland external walls, and transparent glass is arranged through the plurality of brackets.

Further, the depth of the water storage pond is 1.5-2.0 m, hydraulic retention time is 2-3 days, and aeration and oxygenation are performed to keep dissolved oxygen not less than 8.0 mg/L.

Further, the upper carbon source layer and the lower carbon source layer are same in structure and each include a plurality of screen pipes, and the carbon source material is arranged in the screen pipes; the plurality of screen pipes are arranged in a water flow direction, and the screen pipes have a diameter of 100-200 mm, a pore diameter of 5-10 mm, and a hole pitch of 2-5 mm; and the spacing between two adjacent screen pipes is 1.0-2.2 m.

Further, the screen pipes, the carbon source injection pipe, and the connecting pipe are polyvinyl chloride pipes, the pipe diameter of the connecting pipe is 20-100 mm greater than that of the screen pipes, and the pipe diameter of the carbon source injection pipe is 20-50 mm greater than that of the connecting pipe.

Further, the carbon source material includes treated modified plant straws, modified straw biochar, and modified woody biochar particles at a mass ratio of 40:30:30-65:20:15.

Further, the modified plant straw raw material is plant straws in the current year or plant straws stored within 2 years, and the plant straws are a mixture of one or more of skin of corn straws, sunflower straws, cotton straws, soybean straws, sesame straws, skin of sugarcane straws, skin of sorghum straws, corn cobs, and reed straws.

Further, the modified straw biochar raw material is a mixture of one or more of skin of corn straws, skin of sorghum straws, corn cobs, cotton straws, sesame straws, and soybean straws.

Further, the modified woody biochar raw material is branches.

A method for preparing modified plant straws for the constructed wetland structure, including the following steps: crushing and processing plant straws to particles with a particle diameter of 10-20 mm; modifying the particles with 0.75-1.5 mol/L nitric acid; then treating the particles with a modifying solution with 0.05-0.1 mol/L potassium permanganate and 0.01-0.05 mol/L hydrochloric acid, at a concentration of 100-200 kg of the plant straws per cubic meter of the modifying solution. The particles are stirred in the modifying solution at a stirring speed of 5-10 r/m for 36-72 h.

A method for preparing modified straw biochar for the constructed wetland structure, including the following steps: processing a modified straw biochar raw material into particles with a particle diameter of 20-40 mm; carbonizing the particles under a temperature condition of 400-600° C. for 1.0-2.0 h to prepare straw biochar; processing the prepared straw biochar with a modifying solution with 0.01-0.2 mol/L acetic acid and 0.01-1 mmol/L potassium permanganate or a modifying solution with 0.01-0.1 mol/L hydrochloric acid or 0.0001-0.005 mol/L potassium permanganate, at a concentration of 100-150 kg of the biochar per cubic meter of the modifying solution. The biochar is stirred in the modifying solution at a stirring speed of 5-10 r/m for 24-48 h.

A method for preparing modified woody biochar for the constructed wetland structure, including the following steps: processing branches into particles with a particle diameter of 10-30 mm; carbonizing the particles under a temperature condition of 500-650° C. for 1.5-2.5 h to prepare the woody biochar; processing the woody biochar with a modifying solution with 0.01-0.1 mol/L sodium hydroxide and 0.001-0.025 mol/L potassium permanganate, at a concentration of 200-350 kg of the biochar per cubic meter of the modifying solution. The biochar is stirred in the modifying solution at a stirring speed of 5-10 r/m for 24-36 h.

A method for using a carbon source for the constructed wetland structure, including the following steps: prior to injecting the carbon source material into the upper carbon source layer and the lower carbon source layer, putting 1-5% of calcium bentonite and 0.1-1.0% of sodium bentonite in water, uniformly stirring a mixture and then adding a prepared carbon source material that is 5-20% by mass of water, uniformly stirring the mixture again, and connecting the carbon source injection pipe through a high pressure pump and injecting the mixture into the upper carbon source layer and the lower carbon source layer; and prior to injecting the carbon source material, the constructed wetland being in a sewage-free state, and after injection, injecting clean water into the upper carbon source layer and the lower carbon source layer through the carbon source injection pipe to clean the carbon source material 3-5 times, where an amount of the carbon source material initially added into a substrate of the middle layer substrate is 0.5-1.0% by weight of the substrate, and the upper carbon source layer and the lower carbon source layer are injected for first time before operation of the completed constructed wetland; in 5-7 months after operation of the constructed wetland, the constructed wetland stops operating, residual carbon source materials in the screen pipes of the upper carbon source layer and the lower carbon source layer are removed by pumping, a new carbon source material is injected, then residual carbon source materials in the screen pipes are removed every 3-6 months by pumping, and then the new carbon source material is injected, each time injecting an amount of entire space of the screen pipe.

The constructed wetland structure and methods for preparing and using a carbon source provided by the present disclosure have the following beneficial effect:

According to the constructed wetland structure and methods for preparing and using a carbon source provided by the present disclosure, by modifying the biomass, the carbon source is released stably; by arranging the specified carbon source layers for the constructed wetland and alternately arranging the carbon source layers and the water through ports in the units, the uniformity of carbon source distribution in the substrate of the constructed wetland is achieved under the action of the running water flow; by periodically cleaning the residual carbon source poor in carbon source release and replacing the residual carbon source with the new carbon source, the carbon source is used sustainably; a detection result of sewage put in the prepared carbon source shows that the change on the concentration increment of COD and DOC is less than 5%, the change on the electrical conductivity increment is less than 5%, and the slopes of the index increments are greater than 0.4, which is improved by 10% or more compared with those in a conventional method; by using the prepared carbon source, the system in the operational process of the constructed wetland is stable, the change on the concentration of COD is less than 10%, the change on the electrical conductivity is less than 5%, the change on DOC is less than 5%, and the removal rates of total nitrogen, ammonia nitrogen, and nitric nitrogen exceed 85%, which are improved by 10% or more compared with the nitrogen removal rate in the conventional method; the use cycle of the carbon source is more than 3 months, which is improved by 30% or more compared with that in the conventional method. Compared with the conventional method, the operating costs of the method are reduced by 20% or more, and the operating efficiency is improved by 15% or more. The methods for preparing and using the carbon source for the constructed wetland have a significant application effect and feature higher popularization and application value.

BRIEF DESCRIPTION OF FIGURES

The drawings forming a part of the present application serve to provide a further understanding of the present disclosure, and the illustrative embodiments of the present disclosure and the description of the illustrative embodiments serve to explain the present disclosure and are not to be construed as unduly limiting the present disclosure.

In the drawings.

In the figures, 1—water inlet pond; 2—first unit; 3—middle unit; 4—tail unit; 5—water storage pond; 6—bottom plate; 7—drainage channel; 8—permeable plate; 9—bottom layer substrate; 10—middle layer substrate; 11—top layer substrate; 12—wetland plant; 13—upper carbon source layer; 14—lower carbon source layer; 15—carbon source injection pipe; 16—connecting pipe; 17—buttress; 18—water inlet; 19—internal parting wall of water inlet pond; 20—unit partition wall; 21—water outlet; 22—bracket; 23—internal parting wall of water storage pond; 24—wetland external wall; and 25—glass; 26—screen pipe; 27—filter block.

DETAILED DESCRIPTION

Specific embodiments of the present disclosure will be further described in detail below in conjunction with Figures.

Figure 1:
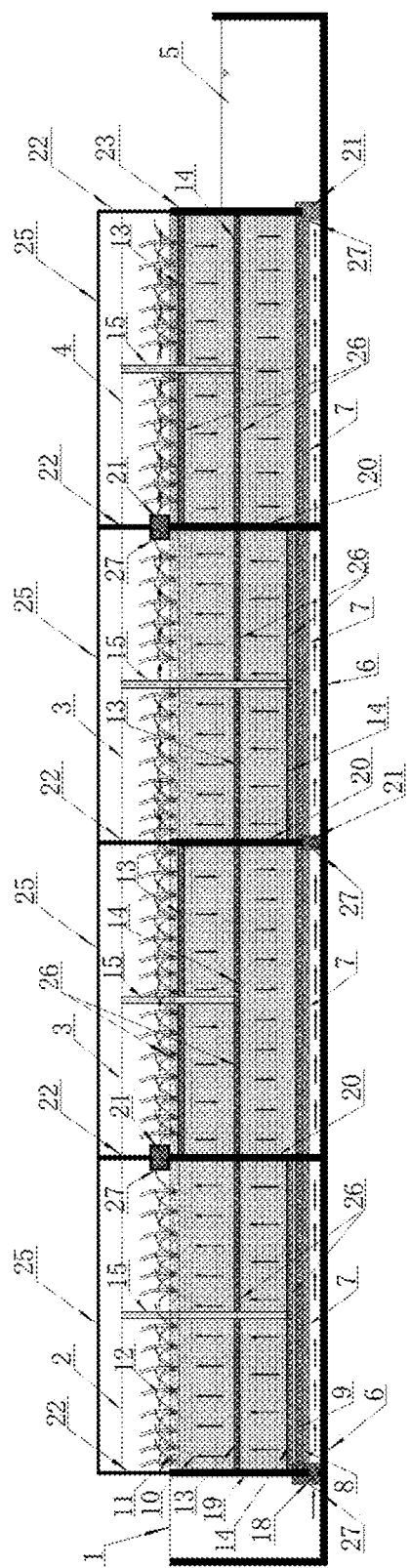
FIG. 1 is a cross-sectional layout diagram of a carbon source arrangement of a constructed wetland structure provided by the present disclosure.
Figure 2:
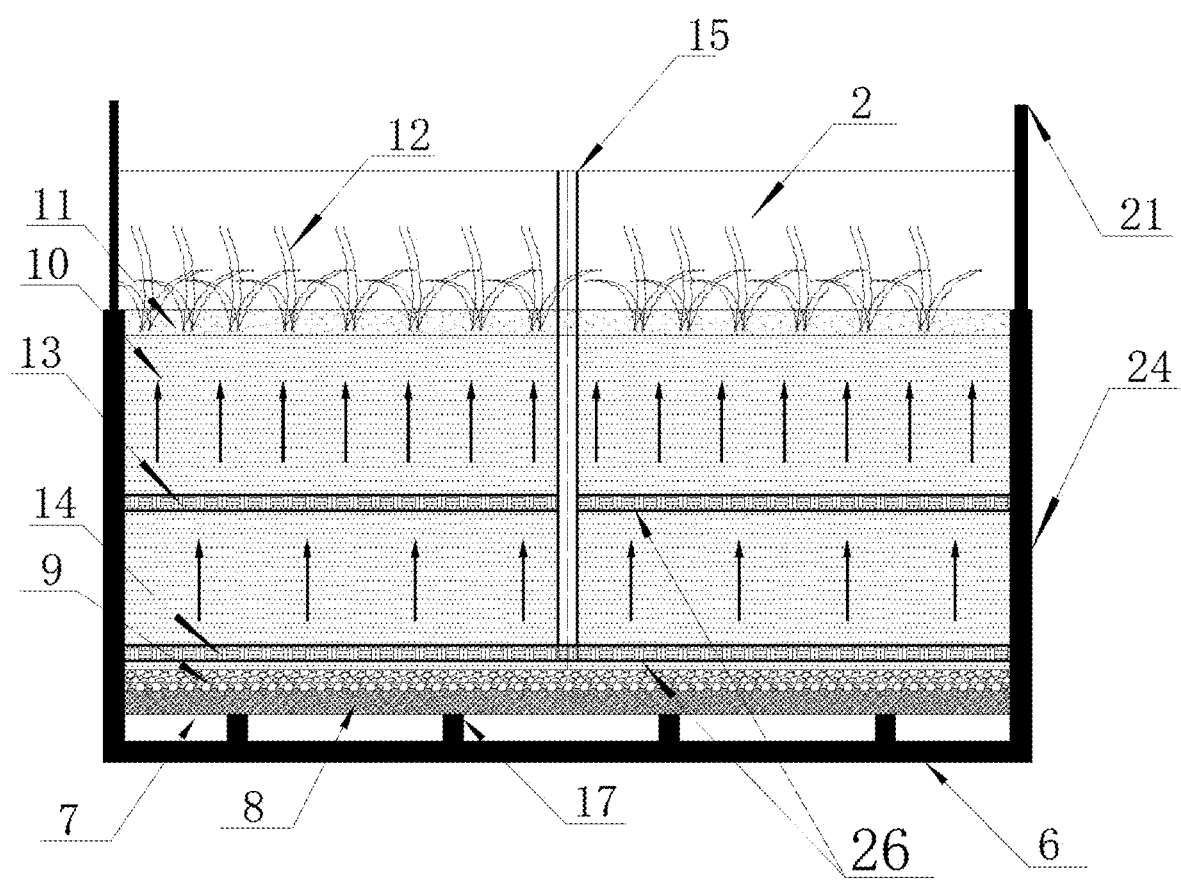
FIG. 2 is a transverse cross-sectional diagram of a carbon source arrangement in a unit of a constructed wetland structure provided by the present disclosure.
Figure 3:
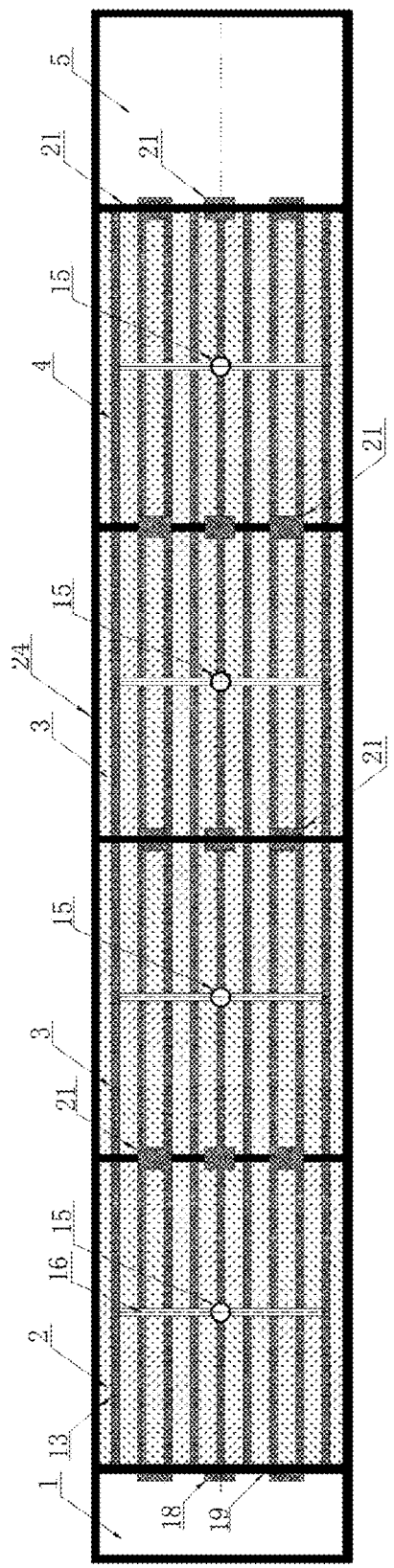
FIG. 3 is a plane graph of a constructed wetland structure provided by the present disclosure.

Specific embodiment I: this embodiment is specifically described with reference to FIG. 1-FIG. 3.

The constructed wetland structure in this embodiment specifically includes a water inlet pond 1, treatment units, and a water storage pond 5, the water inlet pond 1, the treatment unit, and the water storage pond 5 communicating in sequence, where the treatment unit is provided with a bottom plate 6, a drainage channel 7, a permeable plate 8, a bottom layer substrate 9, a middle layer substrate 10, a top layer substrate 11, and wetland plants 12 from bottom to top in sequence; a plurality of buttresses 17 are arranged between the bottom plate 6 and the permeable plate 8 as support; the permeable plate 8 has pores with a pore diameter of 3-8 mm and porosity of 60%; a depth of the water storage pond 5 is 1.5 m, hydraulic retention time is 2 days, then sewage is discharged, and aeration and oxygenation are performed to keep dissolved oxygen not less than 8.0 mg/L; and during operation, the sewage in the water inlet pond 1 passes through the first unit 2, the middle units 3, and the tail unit 4 of the constructed wetland in sequence and is discharged into the water storage pond 5.

The treatment unit includes a first unit 2, two middle units 3, and a tail unit 4, where partition walls are arranged among the water inlet pond 1, the first unit 2, the plurality of middle units 3, the tail unit 4, and the water storage pond 5, and the water inlet pond 1, the first unit 2, the plurality of middle units 3, the tail unit 4, and the water storage pond 5 communicate in sequence through a plurality of water through ports formed in the partition walls, and a filter block 27 is arranged in each of the water through ports; the filter block 27 has pores with a pore diameter of 5-10 mm and porosity of 65%; an upper carbon source layer 13, a lower carbon source layer 14, a carbon source injection pipe 15, and a connecting pipe 16 are arranged in each of the first unit 2, the plurality of middle units 3, and the tail unit 4, and the carbon source injection pipe 15 is longitudinally arranged and communicates with the upper carbon source layer 13 and the lower carbon source layer 14 through the connecting pipe 16, respectively; the upper carbon source layer 13 in the first unit 2 is arranged in the middle of the middle layer substrate 10, and the lower carbon source layer 14 is arranged between the middle layer substrate 10 and the bottom layer substrate 9; and carbon source materials are arranged in the upper carbon source layer 13 and the lower carbon source layer 14.

From the first unit 2, the upper carbon source layer 13 in the first middle unit 3 is arranged between the middle layer substrate 10 and the top layer substrate 11, and the lower carbon source layer 14 is arranged in the middle of the middle layer substrate 10; and the upper carbon source layer 13 in the second middle unit 3 is arranged in the middle of the middle layer substrate 10, and the lower carbon source layer 14 is arranged between the middle layer substrate 10 and the bottom layer substrate 9.

The water through port between the first unit 2 and the water inlet pond 1 is formed at a lower end of the partition wall, the water through port between the first middle unit 3 and the first unit 2 is formed at an upper end of the partition wall, and the water through port between the second middle unit 3 and the first middle unit 3 is formed at the lower end of the partition wall.

The upper carbon source layer 13 in the tail unit 4 is arranged between the middle layer substrate 10 and the top layer substrate 11, and the lower carbon source layer 14 is arranged in the middle of the middle layer substrate 10; the water through port between the tail unit 4 and the previous middle unit 3 is formed at the upper end of the partition wall; and the water through port between the tail unit 4 and the water storage pond 5 is formed at the lower end of the partition wall.

The partition walls include an internal parting wall 19 of the water inlet pond, a plurality of unit partition walls 20, an internal parting wall of water storage pond 23 of the water storage pond, and two wetland external walls 24, where the internal parting wall 19 of the water inlet pond is arranged between the water inlet pond 1 and the first unit 2; the unit partition walls 20 are arranged among the first unit 2, the plurality of middle units 3, and the tail unit 4; the internal parting wall of water storage pond 23 of the water storage pond is arranged between the tail unit 4 and the water storage pond 5; the two wetland external walls 24 are arranged on both sides of the constructed wetland structure in a width direction; and brackets 22 are arranged at upper ends of the internal parting wall 19 of the water inlet pond, the plurality of unit partition walls 20, the internal parting wall of water storage pond 23 of the water storage pond, and the two wetland external walls 24, transparent glass 25 is arranged through the plurality of brackets 22, and the transparent glass 25 is cleaned once every 15 days.

The water through ports includes a plurality of water inlets 18 and a plurality of water outlets 21, the plurality of water inlets 18 are formed in the internal partition wall 19 of the water inlet pond, and the plurality of water outlets 21 are formed in each of the plurality of unit partition walls 20.

The upper carbon source layer 13 and the lower carbon source layer 14 are same in structure and each include a plurality of screen pipes 26, and the carbon source material is arranged in the screen pipes 26; the plurality of screen pipes 26 are arranged in a water flow direction, and the screen pipes 26 have a diameter of 100 mm, a pore diameter of 5 mm, and a hole pitch of 2 mm; and the spacing between two adjacent screen pipes 26 is 1.0 m.

The screen pipes 26, the carbon source injection pipe 15, and the connecting pipe 16 are polyvinyl chloride (PVC) pipes, the pipe diameter of the connecting pipe 16 is 20 mm greater than that of the screen pipes 26, and a pipe diameter of the carbon source injection pipe 15 is 50 mm greater than that of the connecting pipe 16.

The carbon source material includes treated modified plant straws, modified straw biochar, and modified woody biochar particles at a mass ratio of 40:30:30.

The modified plant straw raw material is fresh plant straws in the current year, and the plant straws are skin of corn straws. The modified straw biochar raw material is skin of corn straws. The modified woody biochar raw material is branches of poplars.

A method for preparing modified plant straws for the constructed wetland structure includes the following steps: crushing and processing plant straws to particles with a particle diameter of 10-20 mm; modifying the particles with 0.75 mol/L nitric acid; then treating the particles with a modifying solution with 0.05 mol/L potassium permanganate and 0.01 mol/L hydrochloric acid at a concentration of 200 kg of the straws per cubic meter of the modifying solution. The particles are stirred in the modifying solution at a stirring speed of 10 r/m for 72 h.

A method for preparing modified straw biochar for the constructed wetland structure includes the following steps: processing a modified straw biochar raw material into particles with a particle diameter of 20-40 mm; carbonizing the particles under a temperature condition of 600° C. for 1.0 h to prepare straw biochar; processing the prepared straw biochar with a modifying solution with 0.2 mol/L acetic acid and 1.0 mmol/L potassium permanganate at a concentration of 150 kg of the biochar per cubic meter of the modifying solution. The biochar is stirred in the modifying solution at a stirring speed of 10 r/m for 48 h.

A method for preparing modified woody biochar for the constructed wetland structure includes the following steps: processing branches of poplars into particles with a particle diameter of 10-30 mm; carbonizing the particles under a temperature condition of 650° C. for 1.5 h to prepare the woody biochar; processing the woody biochar with a modifying solution with 0.1 mol/L sodium hydroxide and 0.025 mol/L potassium permanganate at a concentration of 350 kg of the biochar per cubic meter of the modifying solution. The biochar is stirred in the modifying solution at a stirring speed of 10 r/m for 36 h.

A method for using a carbon source for the constructed wetland structure includes the following steps: prior to injecting the carbon source material into the upper carbon source layer 13 and the lower carbon source layer 14, putting 1.0% of calcium bentonite and 1.0% of sodium bentonite in water, uniformly stirring a mixture and then adding a prepared carbon source material that is 20% by mass of water, uniformly stirring the mixture again, and connecting the carbon source injection pipe 15 through a high pressure pump and injecting the mixture into the upper carbon source layer 13 and the lower carbon source layer 14; and prior to injecting the carbon source material, the constructed wetland being in a sewage-free state, and after injection, injecting clean water into the upper carbon source layer 13 and the lower carbon source layer 14 through the carbon source injection pipe 15 to clean the carbon source material 5 times, where an amount of the carbon source material initially added into a substrate of the middle layer substrate 10 is 1.0% by weight of the substrate, and the upper carbon source layer 13 and the lower carbon source layer 14 are injected for first time before operation of the completed constructed wetland; in 7 months after operation of the constructed wetland, the constructed wetland stops operating, residual carbon source materials in the screen pipes 26 of the upper carbon source layer 13 and the lower carbon source layer 14 are removed by pumping, a new carbon source material is injected, then residual carbon source materials in the screen pipes 26 are removed every 4 months by pumping, and then the new carbon source material is injected, each time injecting an amount of entire space of the screen pipe 26.

The load of the constructed wetland is 80 m$^3$/d, the areas of the units of the constructed wetland are the same, with the total area of 100 m$^2$, and after stable operation of the constructed wetland treating urban tail water, experimental results are shown in table 1. The control group shows a condition without adding the carbon source. Compared with the control group, the removal rates of ammonia nitrogen ($NH_4^+$—N), total nitrogen (TN), total phosphorus (TP), and nitric nitrogen (NO$_3^-$—N) are increased by 19.04%, 17.61%, 22.09%, and 20.42%, which are each increased by 15% or more.

TABLE 1

Substrate material treatment and water quality purification effect of constructed wetland.

| Parameter | Index | NH$_4^+$—N | TN | TP | NO$_3^-$—N |
|---|---|---|---|---|---|
| Pollutant concentration/ mg · L$^{-1}$ | Background value | 6.51 ± 0.52 | 17.21 ± 0.53 | 0.86 ± 0.17 | 10.92 ± 0.52 |
| | Control group | 1.72 ± 0.64 | 4.18 ± 1.22 | 0.39 ± 0.11 | 3.52 ± 0.41 |
| | Experimental group | 0.48 ± 0.13 | 1.15 ± 0.21 | 0.20 ± 0.07 | 1.29 ± 0.22 |
| Change of removal rate of pollutants/% | | 73.59→92.63 | 75.71→93.32 | 54.65→76.74 | 67.77→88.19 |

Remark: the removal rates are calculated based on the mean value.

The prepared mixed carbon source is detected in static water, the change of the electrical conductivity with the time is shown in Eq. (1), and the change of the COD concentration is shown in Eq. (2). They are quite obvious in regularity, so that the carbon source is released stably. The carbon source is used stably for 4 months or more. The use cycle of the carbon source in the present disclosure compared with that in the conventional method is increased by 30% or more. Through calculation, the annual operating costs are reduced by 25.7%, and the operating efficiency is increased by 19.3%. The methods for preparing and using the carbon source for the constructed wetland have a significant application effect and feature higher popularization and application value.

$$Y_1 = 4.65x_1 + 69.89 (R^2 = 0.98) \quad (1)$$

where $Y_1$ is the electrical conductivity value, μS·cm$^{-1}$; and x is the time, day.

$$Y_2 = 52.41x_2 + 184.25 (R^2 = 0.96) \quad (2)$$

where $Y_2$ is the COD concentration value, mg/L; and x is the time, day.

Specific Embodiments II

The constructed wetland structure in this embodiment specifically includes a water inlet pond 1, treatment units, and a water storage pond 5, the water inlet pond 1, the treatment unit, and the water storage pond 5 communicating in sequence, where the treatment unit is provided with a bottom plate 6, a drainage channel 7, a permeable plate 8, a bottom layer substrate 9, a middle layer substrate 10, a top layer substrate 11, and wetland plants 12 from bottom to top in sequence; a plurality of buttresses 17 are arranged between the bottom plate 6 and the permeable plate 8 as support; the permeable plate 8 has pores with a pore diameter of 3-8 mm and porosity of 80%; a depth of the water storage pond 5 is 2.0 m, hydraulic retention time is 3 days, then sewage is discharged, and aeration and oxygenation are performed to keep dissolved oxygen not less than 8.0 mg/L; and during operation, the sewage in the water inlet pond 1 passes through the first unit 2, the middle units 3, and the tail unit 4 of the constructed wetland in sequence and is discharged into the water storage pond 5.

The treatment unit includes a first unit 2, three middle units 3, and a tail unit 4, where partition walls are arranged among the water inlet pond 1, the first unit 2, the plurality of middle units 3, the tail unit 4, and the water storage pond 5, and the water inlet pond 1, the first unit 2, the plurality of middle units 3, the tail unit 4, and the water storage pond 5 communicate in sequence through a plurality of water through ports formed in the partition walls, and a filter block 27 is arranged in each of the water through ports; the filter block 27 has pores with a pore diameter of 5-10 mm and porosity of 75%; an upper carbon source layer 13, a lower carbon source layer 14, a carbon source injection pipe 15, and a connecting pipe 16 are arranged in each of the first unit 2, the plurality of middle units 3, and the tail unit 4, and the carbon source injection pipe 15 is longitudinally arranged and communicates with the upper carbon source layer 13 and the lower carbon source layer 14 through the connecting pipe 16, respectively; the upper carbon source layer 13 in the first unit 2 is arranged in the middle of the middle layer substrate 10, and the lower carbon source layer 14 is arranged between the middle layer substrate 10 and the bottom layer substrate 9; and carbon source materials are arranged in the upper carbon source layer 13 and the lower carbon source layer 14.

From the first unit 2, the upper carbon source layer 13 in the odd middle unit 3 is arranged between the middle layer substrate 10 and the top layer substrate 11, and the lower carbon source layer 14 is arranged in the middle of the middle layer substrate 10; and the upper carbon source layer 13 in the even middle unit 3 is arranged in the middle of the middle layer substrate 10, and the lower carbon source layer 14 is arranged between the middle layer substrate 10 and the bottom layer substrate 9.

The water through port between the first unit 2 and the water inlet pond 1 is formed at a lower end of the partition wall, the water through port between the odd middle unit 3 and the previous unit is formed at an upper end of the partition wall, and the water through port between the even middle unit 3 and the previous unit is formed at the lower end of the partition wall.

The upper carbon source layer 13 in the tail unit 4 is arranged in the middle of the middle layer substrate 10, and the lower carbon source layer 14 is arranged between the middle layer substrate 10 and the bottom layer substrate 9; the water through port between the tail unit 4 and the previous middle unit 3 is formed at the lower end of the partition wall; and the water through port between the tail unit 4 and the water storage pond 5 is formed at the upper end of the partition wall.

The partition walls include an internal parting wall 19 of the water inlet pond, a plurality of unit partition walls 20, an internal parting wall of water storage pond 23 of the water storage pond, and two wetland external walls 24, where the internal parting wall 19 of the water inlet pond is arranged between the water inlet pond 1 and the first unit 2; the unit partition walls 20 are arranged among the first unit 2, the plurality of middle units 3, and the tail unit 4; the internal parting wall of water storage pond 23 of the water storage pond is arranged between the tail unit 4 and the water storage pond 5; the two wetland external walls 24 are arranged on both sides of the constructed wetland structure in a width direction; and brackets 22 are arranged at upper ends of the internal parting wall 19 of the water inlet pond, the plurality of unit partition walls 20, the internal parting wall of water storage pond 23 of the water storage pond, and the two wetland external walls 24, transparent glass 25 is arranged through the plurality of brackets 22, and the transparent glass 25 is cleaned once every 20 days.

The water through ports includes a plurality of water inlets 18 and a plurality of water outlets 21, the plurality of water inlets 18 are formed in the internal partition wall 19 of the water inlet pond, and the plurality of water outlets 21 are formed in each of the plurality of unit partition walls 20.

The upper carbon source layer 13 and the lower carbon source layer 14 are same in structure and each include a plurality of screen pipes 26, and the carbon source material is arranged in the screen pipes 26; the plurality of screen pipes 26 are arranged in a water flow direction, and the screen pipes 26 have a diameter of 200 mm, a pore diameter of 10 mm, and a hole pitch of 5 mm; and the spacing between two adjacent screen pipes 26 is 2.2 m.

The screen pipes 26, the carbon source injection pipe 15, and the connecting pipe 16 are polyvinyl chloride (PVC) pipes, the pipe diameter of the connecting pipe 16 is 100 mm greater than that of the screen pipes 26, and a pipe diameter of the carbon source injection pipe 15 is 50 mm greater than that of the connecting pipe 16.

The carbon source material includes treated modified plant straws, modified straw biochar, and modified woody biochar particles, which are prepared by treating, thoroughly cleaning, and airing. The mass ratio of the modified plant straws, modified straw biochar, and modified woody biochar particles is 65:20:15.

The modified plant straw raw material is plant straws stored for 1 year, and the plant straws are a mixture of skin of corn straws and corn cobs. The modified straw biochar raw material is a mixture of skin of corn straws and soybean straws. The modified woody biochar raw material is branches.

A method for preparing modified plant straws for the constructed wetland structure includes the following steps: crushing and processing plant straws to particles with a particle diameter of 10-20 mm; modifying the particles with 1.5 mol/L nitric acid; then treating the particles with a modifying solution with 0.1 mol/L potassium permanganate and 0.05 mol/L hydrochloric acid at a concentration of 100 kg of the straws per cubic meter of the modifying solution. The particles are stirred in the modifying solution at a stirring speed of 5 r/m for 36 h.

A method for preparing modified straw biochar for the constructed wetland structure includes the following steps: processing a modified straw biochar raw material into particles with a particle diameter of 20-40 mm; carbonizing the particles under a temperature condition of 400° C. for 2.0 h to prepare straw biochar; processing the prepared straw biochar with a modifying solution with 0.01 mol/L acetic acid and 0.01 mmol/L potassium permanganate at a concentration of 100 kg of the biochar per cubic meter of the modifying solution. The biochar is stirred in the modifying solution at a stirring speed 5 r/m for 24 h.

A method for preparing modified woody biochar for the constructed wetland structure includes the following steps: processing branches of poplars into particles with a particle diameter of 10-30 mm; carbonizing the particles under a temperature condition of 500° C. for 2.5 h to prepare the woody biochar; processing the woody biochar with a modifying solution with 0.01 mol/L sodium hydroxide and 0.001 mol/L potassium permanganate at a concentration of 200 kg of the biochar per cubic meter of the modifying solution. The biochar is stirred in the modifying solution at a stirring speed of 5-10 r/m for 24 h.

A method for using a carbon source for the constructed wetland structure includes the following steps: prior to injecting the carbon source material into the upper carbon source layer 13 and the lower carbon source layer 14, putting 5.0% of calcium bentonite and 0.1% of sodium bentonite in water, uniformly stirring a mixture and then adding a prepared carbon source material that is 5% by mass of water, uniformly stirring the mixture again, and connecting the carbon source injection pipe 15 through a high pressure pump and injecting the mixture into the upper carbon source layer 13 and the lower carbon source layer 14; and prior to injecting the carbon source material, the constructed wetland being in a sewage-free state, and after injection, injecting clean water into the upper carbon source layer 13 and the lower carbon source layer 14 through the carbon source injection pipe 15 to clean the carbon source material 3 times, where an amount of the carbon source material initially added into a substrate of the middle layer substrate 10 is 0.5% by weight of the substrate, and the upper carbon source layer 13 and the lower carbon source layer 14 are injected for first time before operation of the completed constructed wetland; in 5 months after operation of the constructed wetland, the constructed wetland stops operating, residual carbon source materials in the screen pipes 26 of the upper carbon source layer 13 and the lower carbon source layer 14 are removed by pumping, a new carbon source material is injected, then residual carbon source materials in the screen pipes 26 are removed every 5 months by pumping, and then the new carbon source material is injected, each time injecting an amount of entire space of the screen pipe 26.

The load of the constructed wetland is 100 m³/d, the unit areas of the constructed wetland are the same, with the total area of 125 m², and after stable operation of the constructed wetland treating urban tail water, experimental results are shown in table 2. The control group shows a condition without adding the carbon source. Compared with the control group, the removal rates of ammonia nitrogen ($NH_4^+$—N), total nitrogen (TN), total phosphorus (TP), and nitric nitrogen ($NO_3^-$—N) are increased by 19.8%, 13.65%, 21.74%, and 14.77%, which are each increased by 10% or more.

TABLE 2

Substrate material treatment and water quality purification effect of constructed wetland.

| Parameter | Index | $NH_4^+$—N | TN | TP | $NO_3^-$—N |
|---|---|---|---|---|---|
| Pollutant concentration/ mg·$L^{-1}$ | Background value | 6.21 ± 0.79 | 18.45 ± 1.26 | 0.92 ± 0.24 | 12.79 ± 1.35 |
| | Control group | 1.89 ± 0.42 | 3.89 ± 0.92 | 0.35 ± 0.09 | 3.12 ± 0.35 |
| | Experimental group | 0.66 ± 0.19 | 1.37 ± 0.11 | 0.15 ± 0.06 | 1.23 ± 0.18 |
| Change of removal rate of pollutants/% | | 69.57→89.37 | 78.92→92.57 | 61.96→83.70 | 75.61→90.38 |

Remark: the removal rates are calculated based on the mean value.

The prepared mixed carbon source is detected in static water, the change of the electrical conductivity with the time is shown in Eq. (3), and the change of the COD concentration is shown in Eq. (4). They are quite obvious in regularity, so that the carbon source is released stably. The carbon source has been used stably for more than 5 months. The use cycle of the carbon source in the present disclosure compared with that in the conventional method is increased by more than 40%. Through calculation, the annual operating costs are reduced by 24.1%, and the operating efficiency is increased by 17.9%. The methods for preparing and using the carbon source for the constructed wetland have a significant application effect and feature higher popularization and application value.

$$Y_1 = 4.85x_1 + 82.97 (R^2 = 0.97) \quad (3)$$

where $Y_1$ is the electrical conductivity value, $\mu S \cdot cm^{-1}$; and x is the time, day.

$$Y_2 = 52.41x_2 + 184.25 (R^2 = 0.98) \quad (4)$$

where $Y_2$ is the COD concentration value, mg/L; and x is the time, day.

Specific Embodiments III

The constructed wetland structure in this embodiment specifically includes a water inlet pond 1, treatment units, and a water storage pond 5, the water inlet pond 1, the treatment unit, and the water storage pond 5 communicating in sequence, where the treatment unit is provided with a bottom plate 6, a drainage channel 7, a permeable plate 8, a bottom layer substrate 9, a middle layer substrate 10, a top layer substrate 11, and wetland plants 12 from bottom to top in sequence; a plurality of buttresses 17 are arranged between the bottom plate 6 and the permeable plate 8 as support; the permeable plate 8 has pores with a pore diameter of 3-8 mm and porosity of 70%; a depth of the water storage pond 5 is 1.8 m, hydraulic retention time is 2.5 days, then sewage is discharged, and aeration and oxygenation are performed to keep dissolved oxygen not less than 8.0 mg/L; and during operation, the sewage in the water inlet pond 1 passes through the first unit 2, the middle units 3, and the tail unit 4 of the constructed wetland in sequence and is discharged into the water storage pond 5.

The treatment unit includes a first unit 2, four middle units 3, and a tail unit 4, where partition walls are arranged among the water inlet pond 1, the first unit 2, the plurality of middle units 3, the tail unit 4, and the water storage pond 5, and the water inlet pond 1, the first unit 2, the plurality of middle units 3, the tail unit 4, and the water storage pond 5 communicate in sequence through a plurality of water through ports formed in the partition walls, and a filter block 27 is arranged in each of the water through ports; the filter block 27 has pores with a pore diameter of 5-10 mm and porosity of 85%; an upper carbon source layer 13, a lower carbon source layer 14, a carbon source injection pipe 15, and a connecting pipe 16 are arranged in each of the first unit 2, the plurality of middle units 3, and the tail unit 4, and the carbon source injection pipe 15 is longitudinally arranged and communicates with the upper carbon source layer 13 and the lower carbon source layer 14 through the connecting pipe 16, respectively; the upper carbon source layer 13 in the first unit 2 is arranged in the middle of the middle layer substrate 10, and the lower carbon source layer 14 is arranged between the middle layer substrate 10 and the bottom layer substrate 9; and carbon source materials are arranged in the upper carbon source layer 13 and the lower carbon source layer 14.

From the first unit 2, the upper carbon source layer 13 in the first middle unit 3 is arranged between the middle layer substrate 10 and the top layer substrate 11, and the lower carbon source layer 14 is arranged in the middle of the middle layer substrate 10; and the upper carbon source layer 13 in the second middle unit 3 is arranged in the middle of the middle layer substrate 10, and the lower carbon source layer 14 is arranged between the middle layer substrate 10 and the bottom layer substrate 9.

The water through port between the first unit 2 and the water inlet pond 1 is formed at a lower end of the partition wall, the water through port between the first middle unit 3 and the first unit 2 is formed at an upper end of the partition wall, and the water through port between the second middle unit 3 and the first middle unit 3 is formed at the lower end of the partition wall.

The upper carbon source layer 13 in the tail unit 4 is arranged between the middle layer substrate 10 and the top layer substrate 11, and the lower carbon source layer 14 is arranged in the middle of the middle layer substrate 10; the water through port between the tail unit 4 and the previous middle unit 3 is formed at the upper end of the partition wall; and the water through port between the tail unit 4 and the water storage pond 5 is formed at the lower end of the partition wall.

The partition walls include an internal parting wall 19 of the water inlet pond, a plurality of unit partition walls 20, an internal parting wall of water storage pond 23 of the water storage pond, and two wetland external walls 24, where the internal parting wall 19 of the water inlet pond is arranged between the water inlet pond 1 and the first unit 2; the unit partition walls 20 are arranged among the first unit 2, the plurality of middle units 3, and the tail unit 4; the internal parting wall of water storage pond 23 of the water storage pond is arranged between the tail unit 4 and the water storage pond 5; the two wetland external walls 24 are arranged on both sides of the constructed wetland structure in a width direction; and brackets 22 are arranged at upper ends of the internal parting wall 19 of the water inlet pond, the plurality of unit partition walls 20, the internal parting wall of water storage pond 23 of the water storage pond, and the two wetland external walls 24, transparent glass 25 is arranged through the plurality of brackets 22, and the transparent glass 25 is cleaned once every 15-20 days.

The water through ports includes a plurality of water inlets 18 and a plurality of water outlets 21, the plurality of water inlets 18 are formed in the internal partition wall 19 of the water inlet pond, and the plurality of water outlets 21 are formed in each of the plurality of unit partition walls 20.

The upper carbon source layer 13 and the lower carbon source layer 14 are same in structure and each include a plurality of screen pipes 26, and the carbon source material is arranged in the screen pipes 26; the plurality of screen pipes 26 are arranged in a water flow direction, and the screen pipes 26 have a diameter of 150 mm, a pore diameter of 8 mm, and a hole pitch of 3 mm; and the spacing between two adjacent screen pipes 26 is 2.0 m.

The screen pipes 26, the carbon source injection pipe 15, and the connecting pipe 16 are polyvinyl chloride (PVC) pipes, the pipe diameter of the connecting pipe 16 is 20-100 mm greater than that of the screen pipes, and a pipe diameter of the carbon source injection pipe 15 is 40 mm greater than that of the connecting pipe 16.

The carbon source material includes treated modified plant straws, modified straw biochar, and modified woody biochar particles which are prepared by treating, thoroughly cleaning, and airing. The mass ratio of the modified plant straws, modified straw biochar, and modified woody biochar particles is 55:25:20.

The modified plant straw raw material is plant straws stored within 2 years, and the plant straws are a mixture of corn straw skin and sugarcane straw skin. The modified straw biochar raw material is a mixture of skin of sugarcane straws and corn cobs. The modified woody biochar raw material is branches.

A method for preparing modified plant straws for the constructed wetland structure includes the following steps: crushing and processing plant straws to particles with a particle diameter of 10-20 mm; modifying the particles with 1 mol/L nitric acid; then treating the particles with a modifying solution with 0.08 mol/L potassium permanganate and 0.04 mol/L hydrochloric acid at a concentration of 150 kg of the straws per cubic meter of the modifying solution. The particles are stirred at a stirring speed of 5-10 r/m for 45 h.

A method for preparing modified straw biochar for the constructed wetland structure, including the following steps: processing a modified straw biochar raw material into particles with a particle diameter of 20-40 mm; carbonizing the particles under a temperature condition of 500° C. for 1.5 h to prepare straw biochar; processing the prepared straw biochar with a modifying solution with 0.1 mol/L acetic acid and 0.1 mmol/L potassium permanganate or a modifying solution with 0.05 mol/L hydrochloric acid or 0.002 mol/L potassium permanganate at a concentration of 120 kg of the biochar per cubic meter of the modifying solution. The biochar is stirred in the modifying solution at a stirring speed of 8 r/m for 32 h.

A method for preparing modified woody biochar for the constructed wetland structure includes the following steps: processing branches of poplars into particles with a particle diameter of 10-30 mm; carbonizing the particles under a temperature condition of 600° C. for 2 h to prepare the woody biochar; processing the woody biochar with a modifying solution with 0.05 mol/L sodium hydroxide and 0.01 mol/L potassium permanganate at a concentration of 250 kg of the biochar per cubic meter of the modifying solution. The biochar is stirred in the modifying solution at a stirring speed of 8 r/m for 30 h.

A method for using a carbon source for the constructed wetland structure includes the following steps: prior to injecting the carbon source material into the upper carbon source layer 13 and the lower carbon source layer 14, putting 3% of calcium bentonite and 0.5% of sodium bentonite in water, uniformly stirring a mixture and then adding a prepared carbon source material that is 10% by mass of water, uniformly stirring the mixture again, and connecting the carbon source injection pipe 15 through a high pressure pump and injecting the mixture into the upper carbon source layer 13 and the lower carbon source layer 14; and prior to injecting the carbon source material, the constructed wetland being in a sewage-free state, and after injection, injecting clean water into the upper carbon source layer 13 and the lower carbon source layer 14 through the carbon source injection pipe 15 to clean the carbon source material 4 times, where an amount of the carbon source material initially added into a substrate of the middle layer substrate 10 is 0.8% by weight of the substrate, and the upper carbon source layer 13 and the lower carbon source layer 14 are injected for first time before operation of the completed constructed wetland; in 6 months after operation of the constructed wetland, the constructed wetland stops operating, residual carbon source materials in the screen pipes 26 of the upper carbon source layer 13 and the lower carbon source layer 14 are removed by pumping, a new carbon source material is injected, then residual carbon source materials in the screen pipes 26 are removed every 4 months by pumping, and then the new carbon source material is injected, each time injecting an amount of entire space of the screen pipe 26.

The load of the constructed wetland is 120 m³/d, the areas of the units of the constructed wetland are the same, with the total area of 150 m², and after stable operation of the constructed wetland treating urban tail water, experimental results are shown in table 3. The control group shows a condition without adding the carbon source. Compared with the control group, the removal rates of ammonia nitrogen ($NH_4^+$—N), total nitrogen (TN), total phosphorus (TP), and nitric nitrogen ($NO_3^-$—N) are increased by 26.9%, 15.02%, 20.23%, and 18.54%, which are each increased by 15% or more.

TABLE 3

Substrate material treatment for constructed wetland and water quality purification effect of constructed wetland.

| Parameter | Index | $NH_4^+$—N | TN | TP | $NO_3^-$—N |
|---|---|---|---|---|---|
| Pollutant concentration/ mg · $L^{-1}$ | Background value | 6.32 ± 1.12 | 16.57 ± 1.37 | 0.89 ± 0.19 | 10.95 ± 1.22 |
| | Control group | 2.25 ± 0.31 | 3.55 ± 1.11 | 0.27 ± 0.15 | 3.21 ± 0.32 |
| | Experimental group | 0.55 ± 0.21 | 1.06 ± 0.23 | 0.09 ± 0.04 | 1.18 ± 0.36 |
| Change of removal rate of pollutants/% | | 64.40→91.30 | 78.58→93.60 | 69.66→89.89 | 70.68→89.22 |

Remark: the removal rates are calculated based on the mean value.

The prepared mixed carbon source is detected in static water, the change of the electrical conductivity with the time is shown in Eq. (5), and the change of the COD concentration is shown in Eq. (6). They are quite obvious in regularity, so that the carbon source is released stably. The carbon source is used stably for 4 months or more. The use cycle of the carbon source in the present disclosure compared with that in the conventional method is increased by 30% or more. Through calculation, the annual operating costs are reduced by 26.3%, and the operating efficiency is increased by 15.6%. The methods for preparing and using the carbon source for the constructed wetland have a significant application effect and feature higher popularization and application value.

$$Y_1=5.12x_1+77.82(R^2=0.95) \tag{5}$$

where $Y_1$ is the electrical conductivity value, $\mu S\ cm^{-1}$; and x is the time, day.

$$Y_2=49.62x_2+173.53(R^2=0.97) \tag{6}$$

where $Y_2$ is the COD concentration value, mg/L; and x is the time, day.

Specific Embodiments IV

The constructed wetland structure in this embodiment specifically includes a water inlet pond 1, treatment units, and a water storage pond 5, the water inlet pond 1, the treatment unit, and the water storage pond 5 communicating in sequence, where the treatment unit is provided with a bottom plate 6, a drainage channel 7, a permeable plate 8, a bottom layer substrate 9, a middle layer substrate 10, a top layer substrate 11, and wetland plants 12 from bottom to top in sequence; a plurality of buttresses 17 are arranged between the bottom plate 6 and the permeable plate 8 as support; the permeable plate 8 has pores with a pore diameter of 3-8 mm and porosity of 75%; a depth of the water storage pond 5 is 1.6 m, hydraulic retention time is 2 days, then sewage is discharged, and aeration and oxygenation are performed to keep dissolved oxygen not less than 8.0 mg/L; and during operation, the sewage in the water inlet pond 1 passes through the first unit 2, the middle units 3, and the tail unit 4 of the constructed wetland in sequence and is discharged into the water storage pond 5.

The treatment unit includes a first unit 2, two middle units 3, and a tail unit 4, where partition walls are arranged among the water inlet pond 1, the first unit 2, the plurality of middle units 3, the tail unit 4, and the water storage pond 5, and the water inlet pond 1, the first unit 2, the plurality of middle units 3, the tail unit 4, and the water storage pond 5 communicate in sequence through a plurality of water through ports formed in the partition walls, and a filter block 27 is arranged in each of the water through ports; the filter block 27 has pores with a pore diameter of 5-10 mm and porosity of 75%; an upper carbon source layer 13, a lower carbon source layer 14, a carbon source injection pipe 15, and a connecting pipe 16 are arranged in each of the first unit 2, the plurality of middle units 3, and the tail unit 4, and the carbon source injection pipe 15 is longitudinally arranged and communicates with the upper carbon source layer 13 and the lower carbon source layer 14 through the connecting pipe 16, respectively; the upper carbon source layer 13 in the first unit 2 is arranged in the middle of the middle layer substrate 10, and the lower carbon source layer 14 is arranged between the middle layer substrate 10 and the bottom layer substrate 9; and carbon source materials are arranged in the upper carbon source layer 13 and the lower carbon source layer 14.

From the first unit 2, the upper carbon source layer 13 in the first middle unit 3 is arranged between the middle layer substrate 10 and the top layer substrate 11, and the lower carbon source layer 14 is arranged in the middle of the middle layer substrate 10; and the upper carbon source layer 13 in the second middle unit 3 is arranged in the middle of the middle layer substrate 10, and the lower carbon source layer 14 is arranged between the middle layer substrate 10 and the bottom layer substrate 9.

The water through port between the first unit 2 and the water inlet pond 1 is formed at a lower end of the partition wall, the water through port between the first middle unit 3 and the first unit 2 is formed at an upper end of the partition wall, and the water through port between the second middle unit 3 and the first middle unit 3 is formed at the lower end of the partition wall.

The upper carbon source layer 13 in the tail unit 4 is arranged between the middle layer substrate 10 and the top layer substrate 11, and the lower carbon source layer 14 is arranged in the middle of the middle layer substrate 10; the water through port between the tail unit 4 and the previous middle unit 3 is formed at the upper end of the partition wall; and the water through port between the tail unit 4 and the water storage pond 5 is formed at the lower end of the partition wall.

The partition walls include an internal parting wall 19 of the water inlet pond, a plurality of unit partition walls 20, an internal parting wall of water storage pond 23 of the water storage pond, and two wetland external walls 24, where the internal parting wall 19 of the water inlet pond is arranged between the water inlet pond 1 and the first unit 2; the unit partition walls 20 are arranged among the first unit 2, the plurality of middle units 3, and the tail unit 4; the internal parting wall of water storage pond 23 of the water storage pond is arranged between the tail unit 4 and the water storage pond 5; the two wetland external walls 24 are arranged on both sides of the constructed wetland structure in a width direction; and brackets 22 are arranged at upper ends of the internal parting wall 19 of the water inlet pond, the plurality of unit partition walls 20, the internal parting wall of water storage pond 23 of the water storage pond, and the two wetland external walls 24, transparent glass 25 is arranged through the plurality of brackets 22, and the transparent glass 25 is cleaned once every 18 days.

The water through ports includes a plurality of water inlets 18 and a plurality of water outlets 21, the plurality of water inlets 18 are formed in the internal partition wall 19 of the water inlet pond, and the plurality of water outlets 21 are formed in each of the plurality of unit partition walls 20.

The upper carbon source layer 13 and the lower carbon source layer 14 are same in structure and each include a plurality of screen pipes 26, and the carbon source material is arranged in the screen pipes; the plurality of screen pipes 26 are arranged in a water flow direction, and the screen pipes 26 have a diameter of 100 mm, a pore diameter of 10 mm, and a hole pitch of 5 mm; and the spacing between two adjacent screen pipes 26 is 2.2 m.

The screen pipes 26, the carbon source injection pipe 15, and the connecting pipe 16 are polyvinyl chloride (PVC) pipes, the pipe diameter of the connecting pipe 16 is 50 mm greater than that of the screen pipes 26, and a pipe diameter of the carbon source injection pipe 15 is 20 mm greater than that of the connecting pipe 16.

The carbon source material includes treated modified plant straws, modified straw biochar, and modified woody biochar particles, which are prepared by treating, thoroughly cleaning, and airing. The mass ratio of the modified plant straws, modified straw biochar, and modified woody biochar particles is 60:24:16.

The modified plant straw raw material is plant straws stored within 2 years, and the plant straws are a mixture of corn straw skin and sugarcane straw skin. The modified straw biochar raw material is a mixture of sugarcane straw skin and reed straw skin. The modified woody biochar raw material is branches.

A method for preparing modified plant straws for the constructed wetland structure includes the following steps: crushing and processing plant straws to particles with a particle diameter of 10-20 mm; modifying the particles with 1.25 mol/L nitric acid; then treating the particles with a modifying solution with 0.1 mol/L potassium permanganate and 0.04 mol/L hydrochloric acid at a concentration of 150 kg of the straws per cubic meter of the modifying solution. The particles are stirred in the modifying solution at a stirring speed of 6 r/m for 42 h.

A method for preparing modified straw biochar for the constructed wetland structure includes the following steps: processing a modified straw biochar raw material into particles with a particle diameter of 20-40 mm; carbonizing the particles under a temperature condition of 550° C. for 1.5 h to prepare straw biochar; processing the prepared straw biochar with a modifying solution with 0.01 mol/L acetic acid and 0.0001 mol/L potassium permanganate at a concentration of 135 kg of the biochar per cubic meter of the modifying solution. The biochar is stirred in the modifying solution at a stirring speed of 5 r/m for 48 h.

A method for preparing modified woody biochar for the constructed wetland structure includes the following steps: processing branches of poplars into particles with a particle diameter of 10-30 mm; carbonizing the particles under a temperature condition of 650° C. for 1.5 h to prepare the woody biochar; processing the woody biochar with a modifying solution with 0.01 mol/L sodium hydroxide and 0.025 mol/L potassium permanganate at a concentration of 300 kg of the biochar per cubic meter of the modifying solution. The biochar is stirred in the modifying solution at a stirring speed of 7 r/m for 28 h.

A method for using a carbon source for the constructed wetland structure includes the following steps: prior to injecting the carbon source material into the upper carbon source layer 13 and the lower carbon source layer 14, putting 2% of calcium bentonite and 1.5% of sodium bentonite in water, uniformly stirring a mixture and then adding a prepared carbon source material that is 15% by mass of water, uniformly stirring the mixture again, and connecting the carbon source injection pipe 15 through a high pressure pump and injecting the mixture into the upper carbon source layer 13 and the lower carbon source layer 14; and prior to injecting the carbon source material, the constructed wetland being in a sewage-free state, and after injection, injecting clean water into the upper carbon source layer 13 and the lower carbon source layer 14 through the carbon source injection pipe 15 to clean the carbon source material 5 times, where an amount of the carbon source material initially added into a substrate of the middle layer substrate 10 is 1.0% by weight of the substrate, and the upper carbon source layer 13 and the lower carbon source layer 14 are injected for first time before operation of the completed constructed wetland; in 7 months after operation of the constructed wetland, the constructed wetland stops operating, residual carbon source materials in the screen pipes 26 of the upper carbon source layer 13 and the lower carbon source layer 14 are removed by pumping, a new carbon source material is injected, then residual carbon source materials in the screen pipes 26 are removed every 5 months by pumping, and then the new carbon source material is injected, each time injecting an amount of entire space of the screen pipe 26.

The load of the constructed wetland is 80 $m^3/d$, the areas of the units of the constructed wetland are the same, with the total area of 120 $m^2$, and after stable operation of the constructed wetland treating urban tail water, experimental results are shown in table 4. The control group shows a condition without adding the carbon source. Compared with the control group, the removal rates of ammonia nitrogen ($NH_4^+$—N), total nitrogen (TN), total phosphorus (TP), and nitric nitrogen ($NO_3^-$—N) are increased by 25.23%, 15.13%, 27.16%, and 17.41%, which are each increased by 15% or more.

The prepared mixed carbon source is detected in static water, the change of the electrical conductivity with the time is shown in Eq. (7), and the change of the COD concentration is shown in Eq. (8). They are quite obvious in regularity, so that the carbon source is released stably. The carbon source has been used stably for more than 5 months. The use cycle of the carbon source in the present disclosure compared with that in the conventional method is increased by 30% or more. Through calculation, the annual operating costs are reduced by 23.7%, and the operating efficiency is increased by 17.2%. The methods for preparing and using the carbon source for the constructed wetland have a significant application effect and feature higher popularization and application value.

TABLE 4

Substrate material treatment for constructed wetlands and water quality purification effect of constructed wetland.

| Parameter | Index | $NH_4^+$—N | TN | TP | $NO_3^-$—N |
|---|---|---|---|---|---|
| Pollutant concentration/ $mg \cdot L^{-1}$ | Background value | 5.67 ± 1.32 | 17.12 ± 1.65 | 0.81 ± 0.22 | 13.09 ± 1.34 |
| | Control group | 2.05 ± 0.62 | 3.72 ± 1.09 | 0.32 ± 0.19 | 3.51 ± 0.47 |
| | Experimental group | 0.62 ± 0.19 | 1.13 ± 0.29 | 0.10 ± 0.05 | 1.23 ± 0.31 |
| Change of removal rate of pollutants/% | | 63.84→89.07 | 78.27→93.40 | 60.49→87.65 | 73.19→90.60 |

Remark: the removal rates are calculated based on the mean value.

$$Y_1 = 6.37x_1 + 69.73 (R^2 = 0.97) \quad (7)$$

where $Y_1$ is the electrical conductivity value, $\mu S\ cm^{-1}$; and x is the time, day.

$$Y_2 = 51.23x_2 + 121.35 (R^2 = 0.96) \quad (8)$$

where $Y_2$ is the COD concentration value, mg/L; and x is the time, day.

Specific Embodiments V

The constructed wetland structure in this embodiment specifically includes a water inlet pond 1, treatment units, and a water storage pond 5, the water inlet pond 1, the treatment unit, and the water storage pond 5 communicating in sequence, where the treatment unit is provided with a bottom plate 6, a drainage channel 7, a permeable plate 8, a bottom layer substrate 9, a middle layer substrate 10, a top layer substrate 11, and wetland plants 12 from bottom to top in sequence; a plurality of buttresses 17 are arranged between the bottom plate 6 and the permeable plate 8 as support; the permeable plate 8 has pores with a pore diameter of 3-8 mm and porosity of 80%; a depth of the water storage pond 5 is 2.0 m, hydraulic retention time is 3 days, then sewage is discharged, and aeration and oxygenation are performed to keep dissolved oxygen not less than 8.0 mg/L; and during operation, the sewage in the water inlet pond 1 passes through the first unit 2, the middle units 3, and the tail unit 4 of the constructed wetland in sequence and is discharged into the water storage pond 5.

The treatment unit includes a first unit 2, four middle units 3, and a tail unit 4, where partition walls are arranged among the water inlet pond 1, the first unit 2, the plurality of middle units 3, the tail unit 4, and the water storage pond 5, and the water inlet pond 1, the first unit 2, the plurality of middle units 3, the tail unit 4, and the water storage pond 5 communicate in sequence through a plurality of water through ports formed in the partition walls, and a filter block 27 is arranged in each of the water through ports; the filter block 27 has pores with a pore diameter of 5-10 mm and porosity of 85%; an upper carbon source layer 13, a lower carbon source layer 14, a carbon source injection pipe 15, and a connecting pipe 16 are arranged in each of the first unit 2, the plurality of middle units 3, and the tail unit 4, and the carbon source injection pipe 15 is longitudinally arranged and communicates with the upper carbon source layer 13 and the lower carbon source layer 14 through the connecting pipe 16, respectively; the upper carbon source layer 13 in the first unit 2 is arranged in the middle of the middle layer substrate 10, and the lower carbon source layer 14 is arranged between the middle layer substrate 10 and the bottom layer substrate 9; and carbon source materials are arranged in the upper carbon source layer 13 and the lower carbon source layer 14.

From the first unit 2, the upper carbon source layer 13 in the first middle unit 3 is arranged between the middle layer substrate 10 and the top layer substrate 11, and the lower carbon source layer 14 is arranged in the middle of the middle layer substrate 10; and the upper carbon source layer 13 in the second middle unit 3 is arranged in the middle of the middle layer substrate 10, and the lower carbon source layer 14 is arranged between the middle layer substrate 10 and the bottom layer substrate 9.

The water through port between the first unit 2 and the water inlet pond 1 is formed at a lower end of the partition wall, the water through port between the first middle unit 3 and the first unit 2 is formed at an upper end of the partition wall, and the water through port between the second middle unit 3 and the first middle unit 3 is formed at the lower end of the partition wall.

The upper carbon source layer 13 in the tail unit 4 is arranged between the middle layer substrate 10 and the top layer substrate 11, and the lower carbon source layer 14 is arranged in the middle of the middle layer substrate 10; the water through port between the tail unit 4 and the previous middle unit 3 is formed at the upper end of the partition wall; and the water through port between the tail unit 4 and the water storage pond 5 is formed at the lower end of the partition wall.

The partition walls include an internal parting wall 19 of the water inlet pond, a plurality of unit partition walls 20, an internal parting wall of water storage pond 23 of the water storage pond, and two wetland external walls 24, where the internal parting wall 19 of the water inlet pond is arranged between the water inlet pond 1 and the first unit 2; the unit partition walls 20 are arranged among the first unit 2, the plurality of middle units 3, and the tail unit 4; the internal parting wall of water storage pond 23 of the water storage pond is arranged between the tail unit 4 and the water storage pond 5; the two wetland external walls 24 are arranged on both sides of the constructed wetland structure in a width direction; and brackets 22 are arranged at upper ends of the internal parting wall 19 of the water inlet pond, the plurality of unit partition walls 20, the internal parting wall of water storage pond 23 of the water storage pond, and the two wetland external walls 24, transparent glass 25 is arranged through the plurality of brackets 22, and the transparent glass 25 is cleaned once every 15-20 days.

The water through ports includes a plurality of water inlets 18 and a plurality of water outlets 21, the plurality of water inlets 18 are formed in the internal partition wall 19 of the water inlet pond, and the plurality of water outlets 21 are formed in each of the plurality of unit partition walls 20.

The upper carbon source layer 13 and the lower carbon source layer 14 are same in structure and each include a plurality of screen pipes 26, and the carbon source material is arranged in the screen pipes; the plurality of screen pipes 26 are arranged in a water flow direction, and the screen pipes 26 have a diameter of 180 mm, a pore diameter of 10 mm, and a hole pitch of 5 mm; and the spacing between two adjacent screen pipes 26 is 2.2 m.

The screen pipes 26, the carbon source injection pipe 15, and the connecting pipe 16 are polyvinyl chloride (PVC) pipes, a pipe diameter of the connecting pipe 16 is 60 mm greater than that of the screen pipes 26, and a pipe diameter of the carbon source injection pipe 15 is 30 mm greater than that of the connecting pipe 16.

The carbon source material includes treated modified plant straws, modified straw biochar, and modified woody biochar particles which are prepared by treating, thoroughly cleaning, and airing. The mass ratio of the modified plant straws, modified straw biochar, and modified woody biochar particles is 50:25:25.

The modified plant straw raw material is plant straw stored within 2 years, and the plant straws are a mixture of corn straw skin and sorghum straw skin. The modified straw biochar raw material is a mixture of skin of sorghum straws and soybean straws. The modified woody biochar raw material is branches.

A method for preparing modified plant straws for the constructed wetland structure includes the following steps: crushing and processing plant straws to particles with a particle diameter of 10-20 mm; modifying the particles with 1.1 mol/L nitric acid; then treating the particles with a modifying solution with 0.06 mol/L potassium permanganate and 0.03 mol/L hydrochloric acid at a concentration of 165 kg of the straws per cubic meter of the modifying solution. The particles are stirred in the modifying solution at a stirring speed of 7 r/m for 56 h.

A method for preparing modified straw biochar for the constructed wetland structure includes the following steps: processing a modified straw biochar raw material into particles with a particle diameter of 20-40 mm; carbonizing the particles under a temperature condition of 550° C. for 1.5 h to prepare straw biochar; processing the prepared straw biochar with a modifying solution with 0.1 mol/L acetic acid and 0.005 mol/L potassium permanganate at a concentration of 120 kg of the biochar per cubic meter of the modifying solution. The biochar is stirred in the modifying solution at a stirring speed of 10 r/m for 32 h.

A method for preparing modified woody biochar for the constructed wetland structure includes the following steps: processing branches of poplars into particles with a particle diameter of 10-30 mm; carbonizing the particles under a temperature condition of 650° C. for 1.5 h to prepare the woody biochar; processing the woody biochar with a modifying solution with 0.1 mol/L sodium hydroxide and 0.025 mol/L potassium permanganate at a concentration of 300 kg of the biochar per cubic meter of the modifying solution. The biochar is stirred in the modifying solution at a stirring speed of 8 r/m for 28 h.

A method for using a carbon source for the constructed wetland structure includes the following steps: prior to injecting the carbon source material into the upper carbon source layer 13 and the lower carbon source layer 14, putting 2.5% of calcium bentonite and 1.0% of sodium bentonite in water, uniformly stirring a mixture and then adding a prepared carbon source material that is 15% by mass of water, uniformly stirring the mixture again, and connecting the carbon source injection pipe 15 through a high pressure pump and injecting the mixture into the upper carbon source layer 13 and the lower carbon source layer 14; and prior to injecting the carbon source material, the constructed wetland being in a sewage-free state, and after injection, injecting clean water into the upper carbon source layer 13 and the lower carbon source layer 14 through the carbon source injection pipe 15 to clean the carbon source material 5 times, where an amount of the carbon source material initially added into a substrate of the middle layer substrate 10 is 0.75% by weight of the substrate, and the upper carbon source layer 13 and the lower carbon source layer 14 are injected for first time before operation of the completed constructed wetland; in 6 months after operation of the constructed wetland, the constructed wetland stops operating, residual carbon source materials in the screen pipes 26 of the upper carbon source layer 13 and the lower carbon source layer 14 are removed by pumping, a new carbon source material is injected, then residual carbon source materials in the screen pipes 26 are removed every 5 months by pumping, and then the new carbon source material is injected, each time injecting an amount of entire space of the screen pipe 26.

The load of the constructed wetland is 135 m$^3$/d, the areas of the units of the constructed wetland are the same, with the total area of 200 m$^2$, and after stable operation of the constructed wetland treating urban tail water, experimental results are shown in table 5. The control group shows a condition without adding the carbon source. Compared with the control group, the removal rates of ammonia nitrogen ($NH_4^+$—N), total nitrogen (TN), total phosphorus (TP), and nitric nitrogen ($NO_3^-$—N) are increased by 28.49%, 15.15%, 19.56%, and 20.16%, which are each increased by 15% or more.

TABLE 5

| | Substrate material treatment for constructed wetland and water quality purification effect of constructed wetland. | | | | |
|---|---|---|---|---|---|
| Parameter | Index | $NH_4^+$—N | TN | TP | $NO_3^-$—N |
| Pollutant concentration/ mg · L$^{-1}$ | Background value | 5.93 ± 1.01 | 15.97 ± 1.06 | 0.92 ± 0.31 | 9.62 ± 1.02 |
| | Control group | 2.31 ± 0.28 | 3.41 ± 1.03 | 0.29 ± 0.17 | 2.89 ± 0.26 |
| | Experimental group | 0.62 ± 0.14 | 0.99 ± 0.21 | 0.11 ± 0.05 | 0.95 ± 0.31 |
| Change of removal rate of pollutants/% | | 61.05→89.54 | 78.65→93.80 | 68.48→88.04 | 69.96→90.12 |

Remark: the removal rates are calculated based on the mean value.

The prepared mixed carbon source is detected in static water, the change of the electrical conductivity with the time is shown in Eq. (9), and the change of the COD concentration is shown in Eq. (10). They are quite obvious in regularity, so that the carbon source is released stably. The carbon source has been used stably for more than 5 months. The use cycle of the carbon source in the present disclosure compared with that in the conventional method is increased by more than 35%. Through calculation, the annual operating costs are reduced by 24.2%, and the operating efficiency is increased by 18.1%. The methods for preparing and using the carbon source for the constructed wetland have a significant application effect and feature higher popularization and application value.

$$Y_1=6.71x_1+82.35(R^2=0.98) \quad (9)$$

where $Y_1$ is the electrical conductivity value, $\mu S\ cm^{-1}$; and x is the time, day.

$$Y_2=51.36x_2+153.29(R^2=0.98) \quad (10)$$

where $Y_2$ is the COD concentration value, mg/L; and x is the time, day.

To summarize the above embodiments, according to the constructed wetland structure and methods for preparing and using a carbon source provided by the present disclosure, by modifying the biomass, the carbon source is released stably; by arranging the specified carbon source layers for the constructed wetland and alternately arranging the carbon source layers and the water through ports in the units, the uniformity of carbon source distribution in the substrate of the constructed wetland is achieved under the action of the running water flow; by periodically cleaning the residual carbon source poor in carbon source release and replacing the residual carbon source with the new carbon source, the carbon source is used sustainably; a detection result of sewage put in the prepared carbon source shows that the change on the concentration increment of COD and DOC is less than 5%, the change on the electrical conductivity increment is less than 5%, and the slopes of the index increments are greater than 0.4, which is improved by 10% or more compared with those in a conventional method; by using the prepared carbon source, the system in the operational process of the constructed wetland is stable, the change on the concentration of COD is less than 10%, the change on the electrical conductivity is less than 5%, the change on DOC is less than 5%, and the removal rates of total nitrogen, ammonia nitrogen, and nitric nitrogen exceed 85%, which are improved by 10% or more compared with the nitrogen removal rate in the conventional method; the use cycle of the carbon source is more than 3 months, which is improved by 30% or more compared with that in the conventional method. Compared with the conventional method, the operating costs of the method are reduced by 20% or more, and the operating efficiency is improved by 15% or more. The methods for preparing and using the carbon source for the constructed wetland have a significant application effect and feature higher popularization and application value.

The objects, technical solutions, and beneficial effects of the present disclosure are further described in detail in the above specific embodiments. It shall be understood that the above is merely the specific embodiments of the present disclosure, rather than limiting the present disclosure and may further be a rational combination of features recorded in the embodiments. Any modifications, equivalent replacements, improvements, and the like made within the spirit and principle of the present disclosure shall be covered in the protection scope of the present disclosure.

What is claimed is:

1. A constructed wetland structure, comprising a water inlet pond (1), a first unit (2), a plurality of middle units (3), and a tail unit (4), and a water storage pond (5), with the water inlet pond (1), the first unit (2), the plurality of middle units (3), the tail unit (4), and the water storage pond (5) communicating in sequence,
    wherein the first unit (2), the plurality of middle units (3), and the tail unit (4) are provided with a bottom plate (6), a drainage channel (7), a permeable plate (8), a bottom layer substrate (9), a middle layer substrate (10), a top layer substrate (11), and wetland plants (12) from bottom to top in sequence;
    wherein an internal parting wall (19) of the water inlet pond (1), a plurality of unit partition walls (20), and an internal parting wall (23) of the water storage pond (5) are arranged among the water inlet pond (1), the first unit (2), the plurality of middle units (3), the tail unit (4), and the water storage pond (5);
    wherein the water inlet pond (1), the first unit (2), the plurality of middle units (3), the tail unit (4), and the water storage pond (5) communicate through a water inlet (18) in the internal parting wall (19), and water outlets (21) respectively in the plurality of unit partition walls (20) and in the internal parting wall (23);
    wherein a filter block (27) is arranged in each of the water inlet (18) and water outlets (21);
    wherein an upper carbon source layer (13), a lower carbon source layer (14), a carbon source injection pipe (15), and a connecting pipe (16) are arranged in each of the first unit (2), the plurality of middle units (3), and the tail unit (4), and the carbon source injection pipe (15) is longitudinally arranged and communicates with the upper carbon source layer (13) and the lower carbon source layer (14) through the connecting pipe (16);
    wherein the upper carbon source layer (13) in the first unit (2) is arranged in the middle of the middle layer substrate (10), the lower carbon source layer (14) is arranged between the middle layer substrate (10) and the bottom layer substrate (9), and carbon source materials are arranged in the upper carbon source layer (13) and the lower carbon source layer (14);
    wherein, counting from a most upstream middle unit (3) among the plurality of middle units (3), the upper carbon source layer (13) in an odd-numbered middle unit (3) among the plurality of middle units (3) is arranged between the middle layer substrate (10) and the top layer substrate (11), and the lower carbon source layer (14) is arranged in the middle of the middle layer substrate (10); and the upper carbon source layer (13) in an even-numbered middle unit (3) among the plurality of middle units (3) is arranged in the middle of the middle layer substrate (10), and the lower carbon source layer (14) is arranged between the middle layer substrate (10) and the bottom layer substrate (9);
    wherein the water inlet (18) between the first unit (2) and the water inlet pond (1) is formed at a lower end of the internal parting wall of the water inlet pond (19), the water outlet (21) between the odd-numbered middle unit (3) among the plurality of middle units (3) and any directly upstream middle unit (3) among the plurality of middle units (3) or the first unit (2) is formed at an upper end of one unit partition wall of the plurality of unit partition walls (20) and above the top layer substrate (11), and the water outlet (21) between the even-numbered middle unit (3) among the plurality of middle units (3) and any directly upstream middle unit (3) among the plurality of middle units (3) is formed at the lower end of one unit partition wall of the plurality of the unit partition walls (20) and below the bottom layer substrate (9);

wherein when a total number of the plurality of middle units (3) is even, the upper carbon source layer (13) in the tail unit (4) is arranged between the middle layer substrate (10) and the top layer substrate (11), and the lower carbon source layer (14) is arranged in the middle of the middle layer substrate (10); the water outlet (21) between the tail unit (4) and a directly upstream middle unit (3) among the plurality of middle units (3) is formed at the upper end of one unit partition wall of the plurality of the unit partition walls (20), and the water outlet (21) between the tail unit (4) and the water storage pond (5) is formed at the lower end of the internal parting wall of the water storage pond (23);

wherein when a total number of the plurality of middle units (3) is odd, the upper carbon source layer (13) in the tail unit (4) is arranged in the middle of the middle layer substrate (10), and the lower carbon source layer (14) is arranged between the middle layer substrate (10) and the bottom layer substrate (9); the water outlet (21) between the tail unit (4) and a directly upstream middle unit (3) among the plurality of middle units (3) is formed at the lower end of one unit partition wall of the plurality of the unit partition walls (20), and the water outlet (21) between the tail unit (4) and the water storage pond (5) is formed at the upper end of the internal parting wall of the water storage pond (23);

wherein the upper carbon source layer (13) and the lower carbon source layer (14) are same in structure and each comprises a plurality of screen pipes (26), and the carbon source material is arranged in the screen pipes (26);

wherein the plurality of screen pipes (26) are arranged in a water flow direction, and the screen pipes (26) have a diameter of 100-200 mm, a pore diameter of 5-10 mm, and a hole pitch of 2-5 mm; and the spacing between two adjacent screen pipes (26) is 1.0-2.2 meters;

wherein the carbon source material comprises treated modified plant straws, modified straw biochar, and modified woody biochar particles at a mass ratio in a range of 40:30:30 to 65:20:15, respectively.

2. The constructed wetland structure according to claim 1, wherein the filter block (27) has pores with a pore diameter of 5-10 mm and porosity of 65-85%.

3. The constructed wetland structure according to claim 1, wherein the permeable plate (8) has pores with a pore diameter of 3-8 mm and porosity of 60-80%.

4. The constructed wetland structure according to claim 1, wherein the internal parting wall of the water inlet pond (19) is arranged between the water inlet pond (1) and the first unit (2);

wherein the plurality of unit partition walls (20) are arranged among the first unit (2), the plurality of middle units (3), and the tail unit (4);

wherein the internal parting wall of the water storage pond (23) is arranged between the tail unit (4) and the water storage pond (5);

wherein two wetland external walls (24) are arranged on both sides of the constructed wetland structure in a width direction; and wherein brackets (22) are arranged at upper ends of the internal parting wall of the water inlet pond (19), the plurality of unit partition walls (20), the internal parting wall of water storage pond (23), and the two wetland external walls (24), and transparent glass (25) is arranged through the brackets (22).

5. The constructed wetland structure according to claim 1, wherein a depth of the water storage pond (5) is 1.5-2.0 meters, a hydraulic retention time of the water storage pond (5) is 2-3 days, and dissolved oxygen of the water storage pond (5) not less than 8.0 mg/L.

6. The constructed wetland structure according to claim 1, wherein the screen pipes (26), the carbon source injection pipe (15), and the connecting pipe (16) are polyvinyl chloride (PVC) pipe, a pipe diameter of the connecting pipe (16) is 20-100 mm greater than that of the screen pipes (26), and a pipe diameter of the carbon source injection pipe (15) is 20-50 mm greater than that of the connecting pipe (16).

* * * * *